(12) United States Patent
Bartkowiak (10) Patent No.: US 6,587,559 B1
(45) Date of Patent: Jul. 1, 2003

(54) CROSS-FRAME DUAL TONE MULTIFREQUENCY DETECTOR

(75) Inventor: John G. Bartkowiak, Austin, TX (US)

(73) Assignee: Legerity Inc., Austin, TX (US)

( * ) Notice: Subject to any disclaimer, the term of this patent is extended or adjusted under 35 U.S.C. 154(b) by 0 days.

(21) Appl. No.: 09/159,143

(22) Filed: Sep. 23, 1998

(51) Int. Cl.[7] ............................................. H04M 1/57

(52) U.S. Cl. .................. 379/386; 379/372; 379/142.04

(58) Field of Search .................................. 379/372, 386

(56) References Cited

U.S. PATENT DOCUMENTS

| | | | |
|---|---|---|---|
| 5,588,053 A | 12/1996 | Xie ............................. | 379/386 |
| 5,644,634 A | 7/1997 | Xie et al. .................... | 379/386 |
| 5,694,466 A | * 12/1997 | Xie et al. .................... | 379/282 |

OTHER PUBLICATIONS

Digital Signal Processing Applications Using the ADSP–2100 Family, vol. 1 by the Applications Engineering Staff of Analog Devices, DSP Division, Edited by Army, Mar. 1992 by Analog Devices, Inc., pp. 456–477.

* cited by examiner

Primary Examiner—Forester W. Isen
Assistant Examiner—Daniel Swerdlow
(74) Attorney, Agent, or Firm—Williams, Morgan & Amerson, P.C.

(57) ABSTRACT

A signal detector includes a transform unit and a cross-frame energy level unit. The transform unit is adapted to receive at least a first and a second frame of time domain input samples. The transform unit generates at least a first frequency energy value for the first frame and a second frequency energy value for the second frame based on the time domain input samples. The cross-frame energy level unit is adapted to compare the first frequency energy value to the second frequency energy value to determine the presence of a first tone in the time domain input samples. A method for detecting a signal includes receiving at least a first and a second frame of time domain input samples. At least a first frequency energy value for the first frame and a second frequency energy value for the second frame are generated based on the time domain input samples. The first frequency energy value is compared to the second frequency energy value to determine the presence of a first tone in the time domain input samples.

27 Claims, 4 Drawing Sheets

CROSS-FRAME DUAL TONE MULTIFREQUENCY DETECTOR

BACKGROUND OF THE INVENTION

1. Field of the Invention

This invention relates generally to signal detectors, and more particularly, to a dual one multifrequency detector using cross-frame energy measurement comparisons.

2. Description of the Related Art

Dual tone multifrequency (DTMF) coding is commonly used in telephone systems to transmit information such as a phone number over the connection between a user and a telephone central office. DTMF coding is also becoming popular in interactive control applications, such as telephone banking, electronic mail systems, and answering machines, wherein the user can select options from a menu by sending DTMF signals from a telephone. In applications where a user is dialing a phone number or providing input to an interactive control system, a DTMF detector must discriminate between a valid DTMF signal and speech or noise.

One type of DTMF detection error occurs when the detector erroneously accepts signal imitations, such as those produced by speech or music, as valid signals. This type of error is referred to as talk-off. Another type of detection error occurs when the signal imitation interferes with a valid DTMF signal and prevents it from being detected. This type of error is referred to as talk-down. DTMF detectors have been developed to improve the immunity of the detector to talk-down and talk-off effects.

Methods for detecting DTMF signals are described in U.S. Pat. Nos. 5,588,053 and 5,644,634 issued to Xie et al. (XIE), the specifications of which are herein incorporated by reference in their entireties. In the Xie methods, the analog signal present on the phone line is sampled and transformed to the frequency domain to identify and extract valid DTMF signals. The frequency domain information is analyzed to identify valid DTMF signals and/or reject erroneous signals resulting from speech or noise.

Current telephone systems typically offer services that send a signal to a subscriber (i.e., telephone user) to provide identifying information regarding an incoming call. This service is commonly referred to as Caller ID. The communication of the identifying information occurs only if the user is on-hook (i.e., not using the line). Another common service, commonly referred to as Call Waiting, informs a subscriber currently using the line (i.e., off-hook) that another call is being received.

A new feature has been developed to inform a user currently using the line (i.e., off-hook) that another call is being received from a third party, and to provide identifying information (i.e., Caller ID information) regarding the third party. The user can then decide whether to take or not take the call based on the identity of the third party. To signal the user's telephone system of the incoming third party call, the central office sends a customer premises equipment alerting signal (CAS) on the user's line. The party to which the user is currently communicating does not receive the CAS signal, but it is received by the user's telephone system. The CAS signal is a DTMF encoded signal having a predefined duration. In response to the CAS signal, the user's telephone system enables a modem on the line to detect and receive the Caller ID information. Because the CAS signal may be received during an ongoing conversation, the DTMF detector attempting to identify the CAS signal must have a high immunity to talk-off or talk-down errors.

As defined in proposed United States and international standards, the CAS signal consists of the combination of a 2130 Hz tone and a 2750 Hz tone. As defined by the proposed standard, the DTMF detector should accept the CAS signal if the following parameters are met. The lower tone (2130 Hz) and upper tone (2750 Hz) signals should be accurate in frequency within ±0.5%. The CAS should have a dynamic range of −14 to −32 dBm per tone and a power differential within the dynamic range of 0 to 6 dB between tones. The duration of the CAS signal should be between 75 to 85 ms at the user's equipment (i.e., customer premises equipment). At the central office, the CAS signal tones should start and stop within 1 ms of each other.

In general, a DTMF detector examines the line or communication channel for the presence of two sinusoids using dedicated frequency domain algorithms, including modified Goertzel algorithms, DFT/FFTs, auto-correlation, zero crossing counting, and narrow band filter-based methods, among others.

A common technique for determining energy values in the frequency domain is performed by transforming the time domain sampling data to frequency domain data using a variant of the discrete Fourier transform (DFT) called the Goertzel algorithm. The Goertzel algorithm is a second-order recursive computation of the DFT using a feedback and a feed-forward phase. The feedback phase computes a new output, y(n+1), for every new input sample x(n), where N is the number of input samples. The feedback phase equation is:

$$y(n+1) = c \cdot y(n) - y(n-1) + x(n), \quad \text{Equation 1}$$

where c is the Goertzel coefficient:

$$c = 2 \cdot \cos\left(2\pi \frac{f}{F}\right). \quad \text{Equation 2}$$

In the Goertzel coefficient, f is the frequency to be detected and F is the sampling frequency (i.e., 8 kHz).

The feed-forward phase is normally calculated after the $N^{th}$ data sample is received (i.e., n=N). The feed-forward phase equation provides a single output energy parameter, given by the equation:

$$|Yk(N)|^2 = y(n) \cdot y(n) + y(n-1) \cdot y(n-1) - 2 \cdot c \cdot y(n) \cdot y(n-1), \quad \text{Equation 3}$$

where $$c = 2 \cdot \cos\left(2\pi \frac{f}{F}\right) = 2 \cdot \cos\left(2\pi \frac{k}{N}\right), \quad \text{Equation 4}$$

and $$k = \frac{N}{f} \cdot f. \quad \text{Equation 5}$$

The values for N and k are integers. The choice of the values for k and N for a given tone frequency requires a trade-off between accuracy and speed of detection. As the number of samples, N, increases, the resolution in the frequency domain increases, but the computation time for the feed-forward phase increases. The spacing of the energy output values in the frequency domain from the feed-forward phase is equal to half the sampling frequency divided by N. If the tone being detected, f, does not fall exactly on a selected frequency point (i.e., a frequency bin defined by k and N), part of the energy associated with the frequency point appears in the energy output value of an adjacent frequency point. This phenomenon is referred to as leakage. To avoid leakage, the values of k and N are chosen to attempt to center the tone being detected within a frequency bin.

Once the DTMF detector has calculated the energy values for a given frame of data, the DTMF detector performs various tests to ensure that the detected energy meets the above listed criteria for the CAS signal. Previous DTMF detectors have used various thresholding techniques to determine the presence of valid DTMF tones. These prior techniques, to various extents, lack the degree of noise immunity necessary to reliably detect the presence of the CAS signal.

The present invention is directed to overcoming, or at least reducing the effects of, one or more of the problems set forth above.

SUMMARY OF THE INVENTION

One aspect of the present invention is seen in a signal detector including a transform unit and a cross-frame energy level unit. The transform unit is adapted to receive at least a first and a second frame of time domain input samples. The transform unit generates at least a first frequency energy value for the first frame and a second frequency energy value for the second frame based on the time domain input samples. The cross-frame energy level unit is adapted to compare the first frequency energy value to the second frequency energy value to determine the presence of a first tone in the time domain input samples.

Another aspect of the present invention is seen in a method for detecting a signal. The method includes receiving at least a first and a second frame of time domain input samples. At least a first frequency energy value for the first frame and a second frequency energy value for the second frame are generated based on the time domain input samples. The first frequency energy value is compared to the second frequency energy value to determine the presence of a first tone in the time domain input samples.

BRIEF DESCRIPTION OF THE DRAWINGS

The invention may be best understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
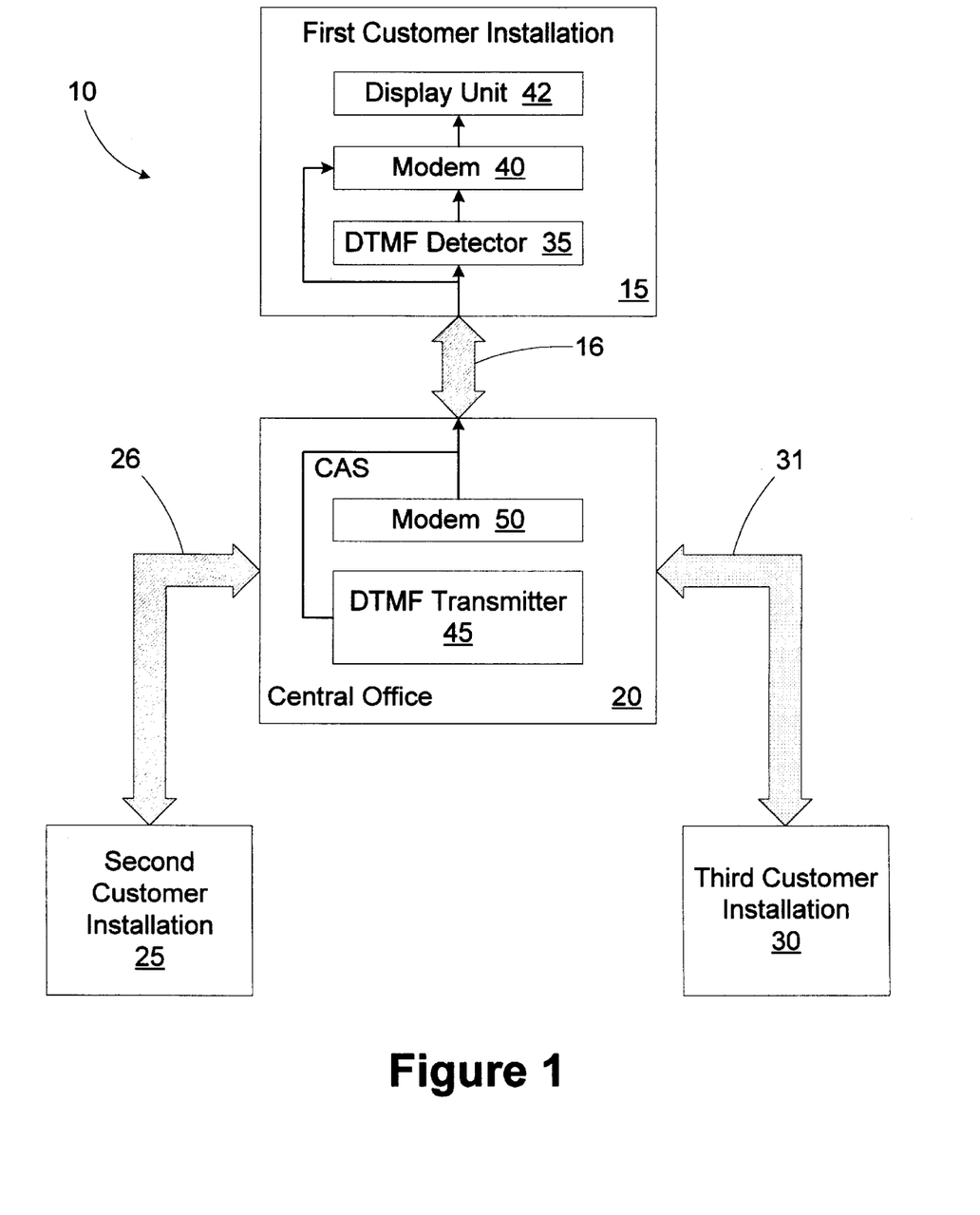
FIG. 1 is a block diagram of a communications system in accordance with the present invention.

Referring now to the Figures, and particularly, to FIG. 1, a block diagram of a communications system 10 is provided. The communications system 10 includes a first customer installation 15, a central office 20, a second customer installation 25, and a third customer installation 30. The first, second, and third customer installations 15, 25, 30 are connected to the central office 20 by subscriber lines 16, 26, and 31, respectively. The first customer installation 15 includes a dual tone multifrequency (DTMF) detector 35, a modem 40, and a display unit 42. The central office 20 includes a DTMF transmitter 45 and a modem 50.

For purposes of illustration, assume a first party at the first customer installation 15 is communicating with a second party at the second customer installation 25. The communication is routed through the central office 20. The communication could be a voice call or a data call (e.g., computer, fax, etc.). During the communication between the first and second parties, a third party at the third customer installation 30 attempts to place a call to the first customer installation 15. The central office 20 detects the attempt made by the third party and sends a customer alert signal (CAS) through the DTMF transmitter 45 over the subscriber line 16. The central office 20 may also send an audible subscriber alert signal (SAS) over the subscriber line 16 to audibly alert the first party of the impending call. The SAS signal is typically a single frequency tone (e.g., 440 Hz in the Unites Stated) that is typically sent before the CAS signal.

The DTMF detector 35 receives the CAS signal, detects its presence, and activates the modem 40 to monitor the subscriber line 16. Following the CAS signal (i.e., after some delay), the modem 50 at the central office 20 transmits a digital data stream containing identifying information on the third customer installation 30, presumably about the third party. The identifying information may include the associated phone number, name of the third party, date, time, or other relevant information. The modem 40 at the first customer installation 15 receives the digital data sent by the modem 50 at the central office 20, and provides the identifying information to the display unit 42. Based on the identifying information, the first party may choose to place the second party on hold and accept the call from the third party. Alternatively, the first party may choose to ignore the call from the third party entirely, or call the third party back at a more convenient time.

Figure 2:
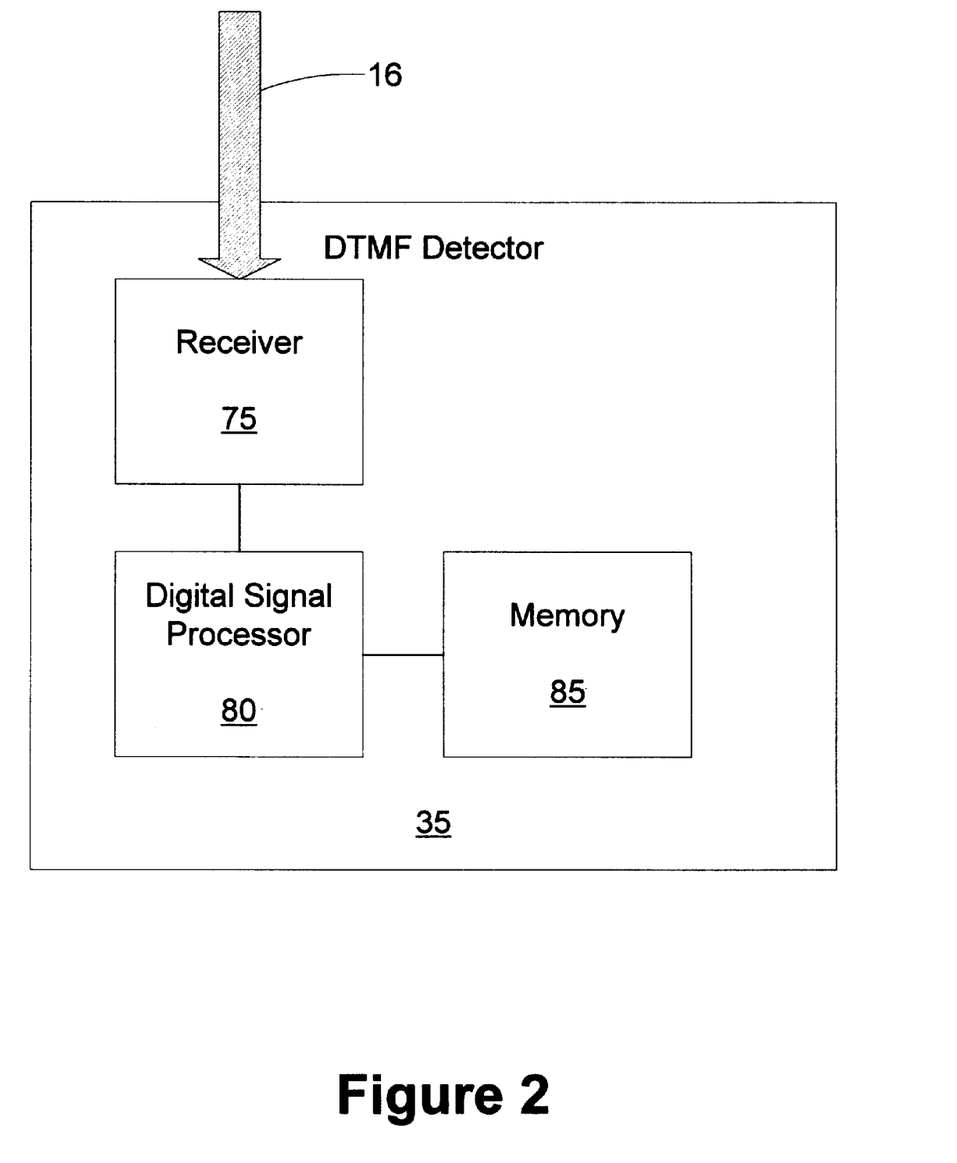
FIG. 2 is physical block diagram of a dual-tone multifrequency detector of FIG. 1.

Referring to FIG. 2, a physical block diagram of the DTMF detector 35 is provided. The DTMF detector 35 includes a receiver 75, a digital signal processor 80, and a memory 85. The receiver 75 is coupled to the subscriber line 16 to receive an analog signal and convert the analog signal into digital format. The receiver 75 samples the analog signal and utilizes pulse code modulation (PCM) or other suitable techniques to produce corresponding digital data.

The receiver 75 may include linear analog to digital (A/D) converters (not shown).

It is noted that the received signal may be compressed or companded, and thus digital data produced by the A/D converter (not shown) in the receiver 75 may be companded (i.e., may comprise logarithmically compressed digital data). As is well-known in the art, companding refers to logarithmically compressing a signal at the source and expanding the signal at the destination to obtain a high end-to-end dynamic range while reducing dynamic range requirements within the communication channel. If the signal is companded, the receiver 75 logarithmically expands the data to a linear format. It is also contemplated that the DTMF detector 35 may receive digital signals (i.e., linear or logarithmic) directly from the subscriber line 16, and thus a receiver 75 is not required in the DTMF detector 35 for analog to digital conversion.

Figure 3:
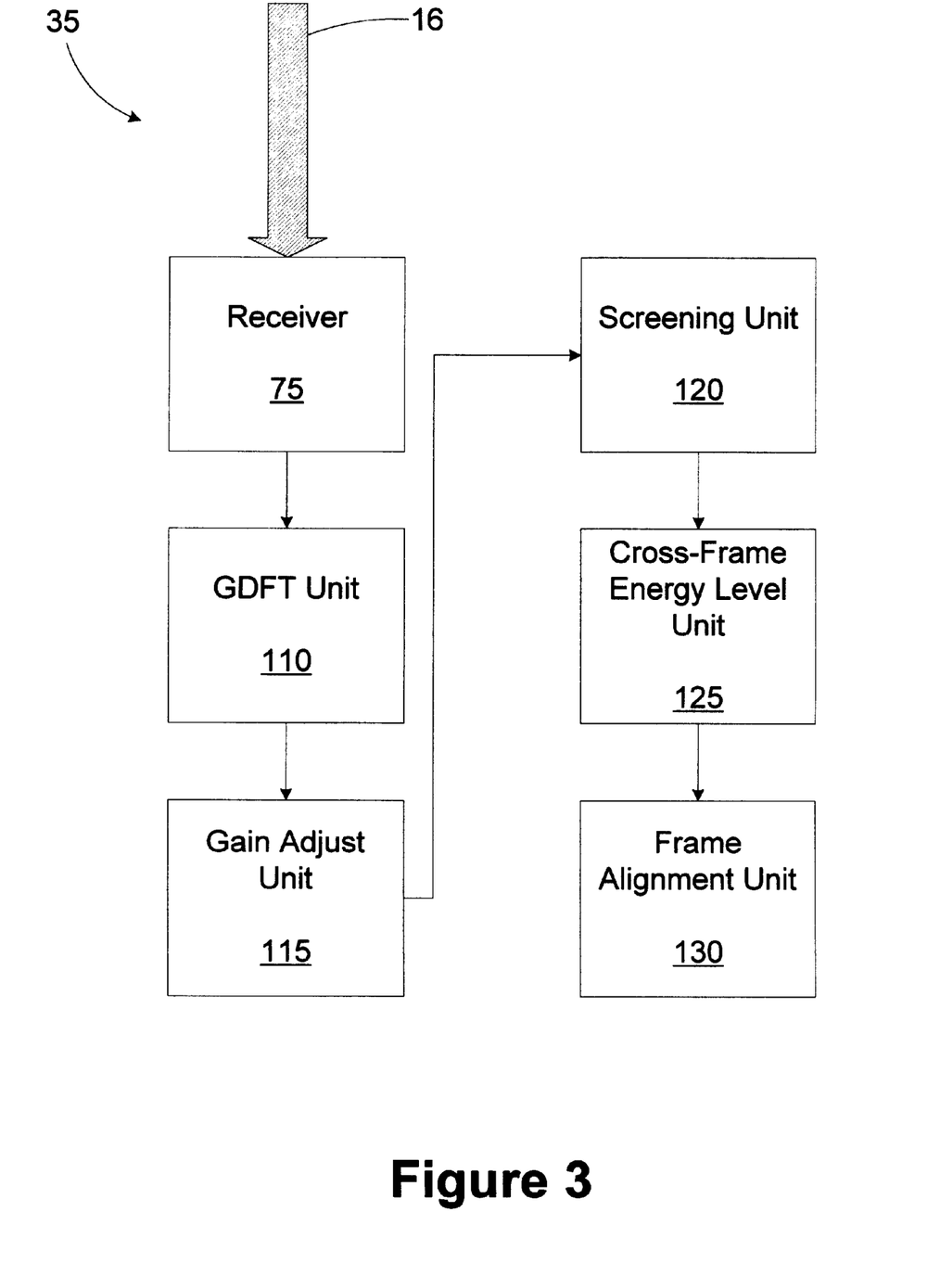
FIG. 3 is functional block diagram of a dual-tone multifrequency detector of FIG. 1.

A functional block diagram of the DTMF detector 35 is provided in FIG. 3. The DTMF detector 35 includes the receiver 75 adapted to sample the signal present on the subscriber line 16, a Goertzel Discrete Fourier Transform (GDFT) unit 110 adapted to transform the time domain samples of the receiver 75 to frequency domain energy values, a gain unit 115 adapted to scale the output of the GDFT unit 110 based on any asymmetry in sample sizes, a screening unit 120 adapted to perform a low-level thresholding function, a cross-frame energy level unit 125 adapted to compare frequency energy levels across frames of data, and a signal alignment unit 130 adapted to determine misalignment between the frames.

It is contemplated that any or all of the functions of the receiver 75, GDFT unit 110, gain unit 115, screening unit 120, cross-frame energy level unit 125, and signal alignment unit 130 may be accomplished by the digital signal processor 80. The memory 85 may be a read-only memory, a random access memory, or a combination thereof. The memory 85 may be employed to store program instructions for execution by the digital signal processor 80. Also, the results of calculations completed by the digital signal processor 80 may be stored in the memory 85. It is also contemplated that a microprocessor (not shown) or other type of general purpose processor (not shown) may be used to perform any or all of the functions of the receiver 75, GDFT unit 110, gain unit 115, screening unit 120, cross-frame energy level unit 125, and signal alignment unit 130.

In the illustrated embodiment, the receiver 75 samples at a frequency of 8 kHz, a common sampling frequency used in telephone systems. The time domain sampling data provided by the receiver 75 is received by the GDFT unit 110. The GDFT unit 110 determines energy output values $|Yk(n)|^2$ at various frequency bins as described above.

Because the sampling frequency, F, is predetermined (e.g., 8 kHz), only the number of samples N may be varied to center the tone frequency, f, within a frequency bin. The values of N used by the GDFT unit 110 in the illustrated embodiment for each of the tones in the CAS signal and their associated errors are shown below in Table 1.

TABLE 1

| f(tone) | N | k(float) | k(integer) | Absolute Error in k | Goertzel Coefficient |
|---|---|---|---|---|---|
| 2130 | 169 | 44.99625 | 45 | 0.00375 | −0.0204126297 |
| 2750 | 160 | 55.0 | 55 | 0 | −1.111140466 |

Because the values of N are different for each of the tones in the CAS signal, the energy output values (i.e., defined by Equation 6) should be normalized prior to comparison. A gain adjust unit 115 receives the raw energy output values from the GDFT unit 110 and scales the energy output value for the 2750 Hz signal by the normalization ratio:

$$\left(\frac{169}{160}\right)^2 = 1.115664063. \qquad \text{Equation 6}$$

The output of the gain adjust unit 115 is received by a screening unit 120. The screening unit 120 evaluates the energy output values for each frame (i.e., set of N samples) to determine if the CAS signal is present. The DTMF detector 35 stores energy output values for six frames of data. The current frame is referred to as frame 0. The DTMF detector 35 also stores the previous frame (frame—1) and the four frames following the current frame (frames 1 through 4).

The screening unit 120 performs a test to determine if the energy output value in a frequency bin for the current frame (i.e., frame 0) passes a predetermined screening threshold. The screening threshold is intentionally set at a relatively low value (i.e., 10 in the illustrated embodiment). The CAS signal may have been received by the DTMF detector 35 in the middle of the initial frame (frame 0). Accordingly, the energy output values would only reflect a partial frame of CAS signal data, and a valid CAS signal might be rejected if the screening threshold is set too high. The screening unit 120 may pass a valid CAS signal, but it may also pass an imitation signal, such as voice or noise. Further testing seeks to reject the imitation signals in favor of actual CAS signals to improve the noise immunity of the DTMF detector 35.

If the screening unit 120 detects a possible valid tone, the next two energy output values (i.e., frames 1 and 2) for the frequency bin are provided to the cross-frame energy level unit 125. Based on the timing of the CAS signal, frames 1 and 2 should represent full energy frames of CAS signal data, assuming a valid CAS signal is present. The cross-frame energy level unit 125 evaluates the energy output values for frames 1 and 2. If the signal resulting in the detection is a valid CAS signal, its energy value for each of the two tones should be consistent across both frames 1 and 2. Also, the energy difference in each frame between the two tones of the CAS signal should be consistent. The energy difference between the tones is referred to as the twist factor.

For each of the energy output values in frames 1 and 2 associated with the DTMF frequencies the cross-frame energy level unit 125 determines a cross-frame energy level ratio defined by the equation:

$$\text{Crossframe Energy Ratio} = \frac{|Yk|^2(Frame1)}{|Yk|^2(Frame2)}. \qquad \text{Equation 7}$$

A cross-frame energy ratio is computed for each of the components of the CAS signal (i.e., 2130 Hz and 2750 Hz). To avoid employing a division, a predetermined scaling coefficient may be multiplied by the greater of the frame 1 and frame 2 energies and compared to the lesser energy. A division computation decreases the computational speed and increases the complexity of the DTMF detector 35. If the scaled energy is greater than the lesser energy, the energy test has failed and the detection is abandoned. In the illustrated embodiment, an effective energy scaling coefficient of 0.8 was determined by experimentation. Other energy scaling coefficients are contemplated, depending on the specific design of the DTMF detector 35.

A cross-frame twist measurement is also computed for each of the components of the CAS signal (i.e., 2130 Hz and 2750 Hz). A twist measurement evaluates the difference between the output energies of the two tones across the frames (in decibels). The cross-frame twist measurement is defined by the equation:

$$\text{Crossframe Twist Ratio} = $$

$$\frac{|Yk|^2(Frame1 - 2130)}{|Yk|^2(Frame1 - 2750)}(dB) - \frac{|Yk|^2(Frame2 - 2130)}{|Yk|^2(Frame2 - 2750)}(dB). \quad \text{Equation 8}$$

Again, an alternative calculation may be used to avoid division. It was determined experimentally that reliable detection results may be obtained if the twist difference is less than about ±0.97 dB. A predetermined twist coefficient may be used to evaluate the twist. To calculate the cross-frame twist, the following equations may be used:

$$p = |Yk|^2(\text{Frame1}-2130) \cdot |Yk|^2(\text{Frame2}-2750)$$

$$q = |Yk|^2(\text{Frame1}-2750) \cdot |Yk|^2(\text{Frame2}-2130) \quad \text{Equations 8, 9}$$

The greater of p and q is multiplied by a twist scaling factor to generate a scaled twist energy, r. If the scaled twist energy, r, is greater than the lesser of p and q, the twist test has failed, and the detection is abandoned. The twist scaling factor corresponding to a difference of about ±0.97 dB is 0.8. Again, it is contemplated that other twist scaling coefficients may be used, depending on the specific application.

If either of the cross-frame energy level and twist tests fail, the frame 1 energy values become frame 0 energy values, and the DTMF detector 35 attempts to detect a valid CAS signal using the new energy values (i.e., frame 1 becomes frame 0', frame 2 becomes frame 1', and frame 3 becomes frame 2'.) The DTMF detector 35 provides the new frame 0' energy output value to the screening unit 120, and the testing proceeds as described above.

If both of the cross-frame energy level and twist tests pass, the DTMF detector 35 proceeds with detection of the CAS signal. Other tests may be performed to validate the receipt of the CAS signal. For example, the DTMF detector 35 may include the signal alignment unit 130 that determines if the two tones of the CAS signal are misaligned. The DTMF detector 35 may abandon the detection if the misalignment is significant. A method and apparatus for detecting signal misalignment is described in U.S. patent application Ser. No. 09/159,028, entitled "Method and Apparatus for Detecting Signal Misalignment," filed on the same date as this application, and incorporated herein by reference in its entirety.

Figure 4:
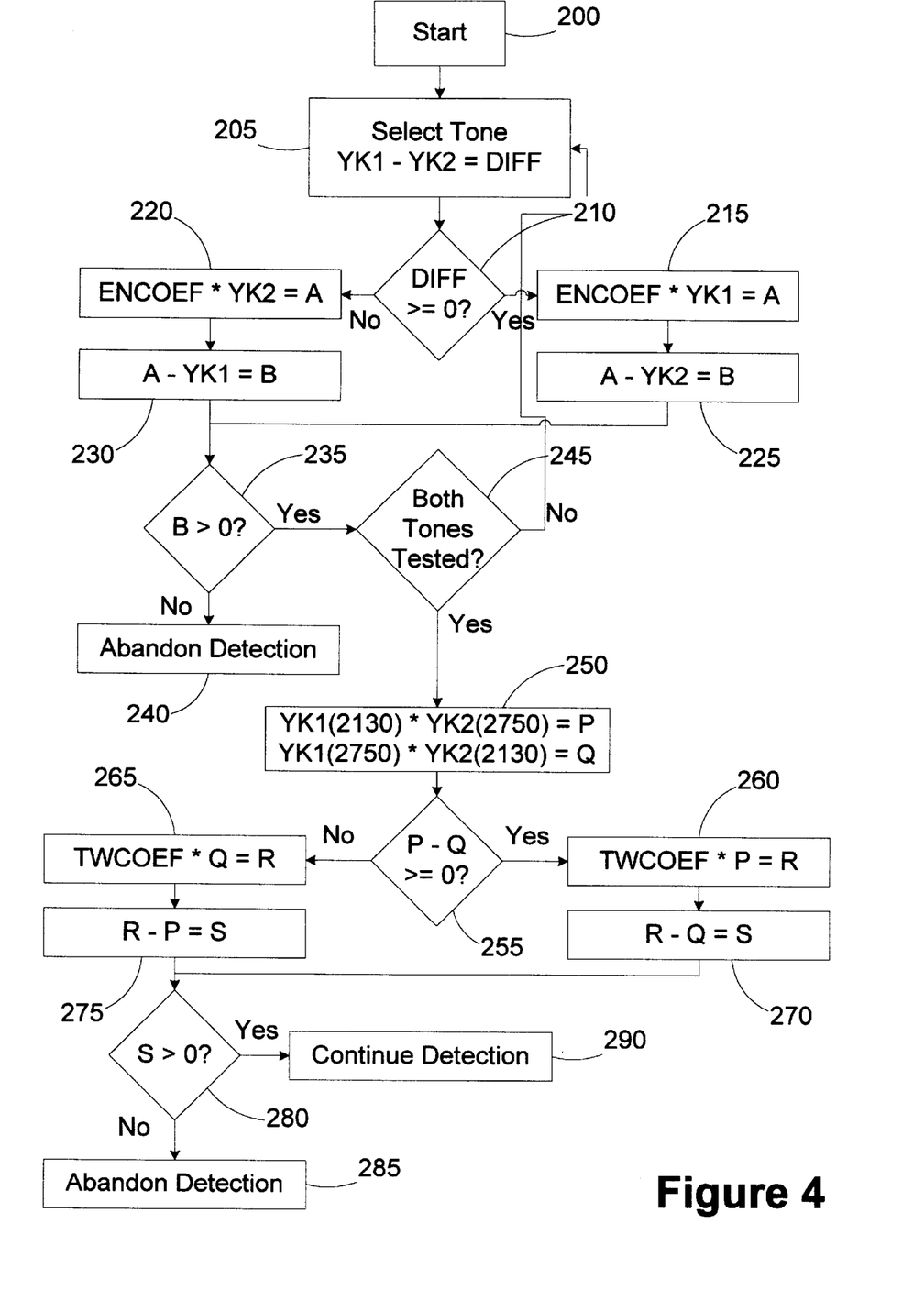
FIG. 4 is a flow chart of a method for performing cross-frame energy level and twist measurements in accordance with the present invention.

Referring to FIG. 4, a flow chart of a method for performing the cross-frame energy level and twist measurements is provided. It is assumed that the test performed by the screening unit 120 has passed. The cross-frame energy level test is entered in block 200. One of the tones is selected in block 205, and the energy output values for frame 1 (YK1) and frame 2 (YK2) are subtracted. Depending on the difference evaluated in block 210, the greater of the frame 1 and frame 2 energies is scaled by the energy scaling coefficient (i.e., ENCOEF=0.8) in either block 215 (YK1 greater) or block 220 (YK2 greater) to yield a scaled energy value, A. The lesser of the YK1 and YK2 values is subtracted from the scaled energy value A to determine an energy difference, B, in block 225 (YK1 greater) or block 230 (YK2 greater). If the energy difference, B, is determined to be positive in block 235, the cross-frame energy level test is failed and the detection is abandoned in block 240.

Otherwise, the cross-frame energy level test is passed. If both tones have not yet been tested in block 245, the method is repeated from block 205 with the second tone.

If both tones have passed the cross-frame energy level test, the cross-frame twist test is entered in block 250. Cross-frame twist values P and Q are determined in block 250. The difference between the cross-frame twist values P and Q is determined in block 255. Depending on the difference evaluated in block 255, the greater of the P and Q energies is scaled by the twist scaling coefficient (i.e., TWCOEF=0.8) in either block 260 (P greater) or block 265 (Q greater) to yield a scaled twist value, R. The lesser of the P and Q values is subtracted from the scaled twist value R to determine a twist difference, S, in block 270 (P greater) or block 230 (Q greater). If the twist difference, S, is determined to be positive in block 280, the cross-frame twist test is failed and the detection is abandoned in block 285. Otherwise, the cross-frame twist test is passed and the detection process continues in block 290.

After completing the cross-frame energy level and twist tests, the digital signal processor 80 may set a flag indicating a detection or may set a flag indicating no detection. The may be an internal flag within the digital signal processor 80 or a flag within the memory 85.

The operation of the cross-frame energy level unit 125 in accordance with the method of FIG. 4 is illustrated by the following examples. The examples are provided for illustrative purposes and are not to be interpreted as limiting the application of the present invention. A first set of hypothetical energy values is illustrated below in Table 2.

TABLE 2

| Frame # | 2130 Hz energy | 2750 Hz energy |
| --- | --- | --- |
| −1 | 1 | 0 |
| 0 | 993 | 791 |
| 1 | 1719 | 1611 |
| 2 | 1621 | 1542 |
| 3 | 1872 | 1532 |
| 4 | 4 | 3 |

The values of Table 2 were obtained by supplying a −22 dBm CAS signal to the DTMF detector 35 having a duration of 80 ms. The CAS signal was sent in the presence of background speech and music. The CAS signal was received during frame 0, accordingly the frame 0 values represent partial frame energies. Frames 1 and 2 represent full frame energies. Frame 3 may or may not represent a full frame, depending on when the CAS signal was received in frame 0.

The cross-frame energy level test is conducted in accordance with FIG. 4. The greater energy value for the 2130 Hz signal was received in frame 1. The scaled energy is A(2130)=1719*0.8=1375. The scaled energy level is less than the frame 2 energy value of 1621, so the 2130 Hz tone passes the cross-frame energy level test. The greater energy value for the 2750 Hz signal was also received in frame 1. The scaled energy is A(2750)=1611*0.8=1288. The scaled energy level is less than the frame 2 energy value of 1542, so the 2130 Hz tone also passes the cross-frame energy level test.

Next, the cross-frame twist test is performed. The cross-frame twist values are P=1719*1542=2650698 and Q=1611*1621=2611431. The twist value P is greater than Q, so P is scaled to yield R=P*0.8=2120558. The scaled twist value R, is less than Q (i.e., the lesser of P and Q), so the cross-frame twist test also passes.

A second set of hypothetical energy values is illustrated below in Table 3. The values of Table 3 were obtained by supplying a −9 dBm speech and music signal to the DTMF detector 35.

TABLE 3

| Frame # | 2130 Hz energy | 2750 Hz energy |
|---|---|---|
| 0 | 64 | 40 |
| 1 | 107 | 330 |
| 2 | 90 | 239 |
| 3 | * | * |

The cross-frame energy level test is conducted in accordance with FIG. 4. The greater energy value for the 2130 Hz signal was received in frame 1. The scaled energy is A(2130)=107*0.8=85. The scaled energy level is less than the frame 2 energy value of 90, so the 2130 Hz tone passes the cross-frame energy level test. The greater energy value for the 2750 Hz signal was also received in frame 1. The scaled energy is A(2750)=330*0.8=264. The scaled energy level is greater than the frame 2 energy value of 239, so the 2130 Hz tone fails the cross-frame energy level test, and the detection is abandoned.

A third set of hypothetical energy values is illustrated below in Table 4. The values of Table 4 were obtained by supplying a −9 dBm speech and music signal to the DTMF detector 35.

TABLE 4

| Frame # | 2130 Hz energy | 2750 Hz energy |
|---|---|---|
| 0 | 49 | 71 |
| 1 | 442 | 274 |
| 2 | 358 | 340 |
| 3 | * | * |

The cross-frame energy level test is conducted in accordance with FIG. 4. The greater energy value for the 2130 Hz signal was received in frame 1. The scaled energy is A(2130)=442*0.8=353. The scaled energy level is less than the frame 2 energy value of 358, so the 2130 Hz tone passes the cross-frame energy level test. The greater energy value for the 2750 Hz signal was received in frame 2. The scaled energy is A(2750)=340*0.8=272. The scaled energy level is less than the frame 2 energy value of 274, so the 2130 Hz tone also passes the cross-frame energy level test.

Next, the cross-frame twist test is performed. The cross-frame twist values are P=442*340=150280 and Q=274*358=98092. The twist value P is greater than Q, so P is scaled to yield R=P*0.8=120224. The scaled twist value, R, is greater than Q (i.e., the lesser of P and Q), so the cross-frame twist test fails and the detection is abandoned.

The examples listed above illustrate the improved immunity of the DTMF detector 35 to false detections produced by imitation signals, such as voice and noise. In the examples listed above the energy and twist scaling coefficients were selected to be the same value of 0.8. It is contemplated that other scaling coefficients may be used, depending on the specific application. The energy scaling coefficient and the twist scaling coefficient need not be the same value.

It was determined by experimentation that varying the scaling coefficient between 0.52 and 0.85 allows the algorithm's immunity to false detections caused by speech, noise, etc., to be varied. However, the selected value depends on the application environment (i.e., the level of speech tolerated when the CAS signal is present or not present). A trade-off exists in an application where the DTMF detector 35 is to be tolerant to both false detections and missed true detections caused by the presence of speech. As the scaling coefficient gets smaller, the talk-down performance of the DTMF detector 35 (i.e., the ability to correctly detect tones when speech is masking them) improves, but the talk-off performance (i.e., immunity to false detection caused by speech alone) worsens.

Although the present invention is described in reference to the detection a specific DTMF signal, the CAS signal, the application of the present invention is not so limited. The apparatus and methods described herein may be applied to improve the immunity of other in-band signaling detectors (not shown) to the presence of imitation signals in tone detection applications. It is also contemplated that the present invention may be applied to a multi tone multi frequency (MTMF) detector for detecting any number of tones in a received signal (i.e., two or more tones).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A signal detector, comprising:
    a transform unit adapted to receive at least a first and a second frame of time domain input samples, generate at least a first frequency energy value for the first frame, a second frequency energy value for the second frame, a third frequency energy value for the first frame, and a fourth frequency energy value for the second frame based on the time domain input samples, wherein the first and second frequency energy values are associated with a first tone frequency, and the third and fourth frequency energy values are associated with a second tone frequency; and
    a cross-frame energy level unit adapted to compare the first frequency energy value to the second frequency energy value to determine the presence of a first tone in the time domain input samples and compare the third frequency energy value to the fourth frequency energy value to determine the presence of a second tone in the time domain input samples, and the cross-frame energy level unit is adapted to determine a first twist between the first and third frequency energy values, determine a second twist between the second and fourth frequency energy values, and compare the first and second twists to determine the presence of the first and second tones.

2. The signal detector of claim 1, further comprising:
    a receiver adapted to sample an input signal and generate the first and second frames of time domain input signal samples.

3. The signal detector of claim 1, wherein the cross-frame energy level unit is adapted to multiply the first frequency energy value by the fourth frequency energy value to determine a first twist value, multiply the second frequency energy value by the third frequency energy value to determine a second twist value, scale the greater of the first and second twist values to determine a scaled twist value, and compare the lesser of the first and second twist values to the scaled twist value to determine the presence of the first and second tones.

4. A signal detector, comprising:
a transform unit adapted to receive at least a first and a second frame of time domain input samples, generate at least a first frequency energy value for the first frame and a second frequency energy value for the second frame based on the time domain input samples; and
a cross-frame energy level unit adapted to compare the first frequency energy value to the second frequency energy value to determine the presence of a first tone in the time domain input sample, wherein the cross-frame energy level unit is further adapted to scale the greater of the first and second frequency energy values to generate a scaled energy value and compare the scaled energy value to the lesser of the first and second frequency energy values to determine the presence of the first tone.

5. A signal detector, comprising:
a processor adapted to receive at least a first and second frame of time domain input samples; and
a memory device coupled to the processor and adapted to store program instructions, that when executed by the processor:
generate a first frequency energy value for the first frame, a second frequency energy value for the second frame, a third frequency energy value for the first frame and a fourth frequency energy value for the second frame based on the time domain input samples, wherein the first and second frequency energy values are associated with a first tone frequency, and the third and fourth frequency energy values are associated with a second tone frequency;
compare a first frequency energy value associated with the first frame to a second frequency energy value associated with the second frame to determine the presence of a first tone in the time domain input samples and compare the third frequency energy value to the fourth frequency energy value to determine the presence of a second tone in the time domain input samples;
determine a first twist between the first and third frequency energy values, determine a second twist between the second and fourth frequency energy values; and
compare the first and second twists to determine the presence of the first and second tones.

6. The signal detector of claim 5, further comprising:
a receiver coupled to the processor and being adapted to sample an input signal and generate the first and second frames of time domain input signal samples.

7. The signal detector of claim 5, wherein the program instructions, when executed by the processor, multiply the first frequency energy value by the fourth frequency energy value to determine a first twist value, multiply the second frequency energy value by the third frequency energy value to determine a second twist value, scale the greater of the first and second twist values to determine a scaled twist value, and compare the lesser of the first and second twist values to the scaled twist value to determine the presence of the first and second tones.

8. A signal detector, comprising:
a processor adapted to receive at least a first and a second frame of time domain input samples; and
a memory device coupled to the processor and adapted to store program instructions, that when executed by the processor:
generate at least one frequency energy value for each of the first and second frames based on the time domain input samples;
compare a first frequency energy value associated with the first frame to a second frequency energy value associated with the second frame to determine the presence of a first tone in the time domain input samples; and
scale the greater of the first and second frequency energy values to generate a scaled energy value and compare the scaled energy value to the lesser of the first and second frequency values to determine the presence of the first tone.

9. A signal detector, comprising:
a transform unit adapted to receive at least a first and a second frame of time domain input samples and generate a plurality of frequency values for the first and second frames; and
a cross-frame energy level unit adapted to determine a cross-frame twist ratio based on the plurality of frequency values and determine the presence of a first tone and a second tone in the time domain input samples based on the cross-frame twist ratio.

10. The signal detector of claim 9, the transform unit is adapted to generate at least a first frequency energy value for the first frame, a second frequency energy value for the second frame, a third frequency energy value for the first frame, and a fourth frequency energy value for the second frame based on the time domain input samples.

11. The signal detector of claim 10, wherein the cross-frame-energy level unit is adapted to determine a first twist between the first and third frequency energy values, determine a second twist between the second and fourth frequency energy values, and compare the first and second twists to determine the cross-frame twist ratio.

12. The signal detector of claim 10, wherein the first and second frequency energy values are associated with a first tone frequency, and the third and fourth frequency energy values are associated with a second tone frequency.

13. The signal detector of claim 10, wherein the cross-frame energy level unit is adapted to multiply the first frequency energy value by the fourth frequency energy value to determine a first twist value, multiply the second frequency energy value by the third frequency energy value to determine a second twist value, scale the greater of the first and second twist values to determine a scaled twist value, and compare the lesser of the first and second twist values to the scaled twist value to determine the presence of the first and second tones.

14. A method for detecting a signal, comprising:
receiving at least a first and a second frame of time domain input samples;
generating at least a first frequency energy value for the first frame and a second frequency energy value for the second frame based on the time domain input samples and a first tone frequency;
generating at least a third frequency energy value for the first frame and a fourth frequency energy value for the second frame based on the time domain input samples and a second tone frequency;
comparing the first frequency energy value to the second frequency energy value to determine the presence of a first tone in the time domain input samples;
comparing the third frequency energy value to the fourth frequency energy value to determine the presence of a second tone in the time domain input samples;
determining a first twist between the first and third frequency energy values;
determining a second twist between the second and fourth frequency energy values; and comparing the first and second twists to determine the presence of the first and second tones.

15. The method of claim 14, further comprising:
receiving an input signal; and
sampling the input signal to generate the first and second frames of time domain input signal samples.

16. A method for detecting a signal, comprising:
receiving at least a first and a second frame of time domain input samples;
generating at least a first frequency energy value for the first frame and a second frequency energy value for the second frame based on the time domain input samples;
comparing the first frequency energy value to the second frequency energy value to determine the presence of a first tone in the time domain input samples;
scaling the greater of the first and second frequency energy values to generate a scaled energy value; and
comparing the scaled energy value to the lesser of the first and second frequency energy values to determine the presence of the first tone.

17. A method for detecting a signal, comprising:
receiving at least a first and a second frame of time domain input samples;
generating at least a first frequency energy value for the first frame and a second frequency energy value for the second frame based on the time domain input samples and a first tone frequency;
generating at least a third frequency energy value for the first frame and a fourth frequency energy value for the second frame based on the time domain input samples and a second tone frequency;
comparing the first frequency energy value to the second frequency energy value to determine the presence of a first tone in the time domain input samples;
comparing the third frequency energy value to the fourth frequency energy value to determine the presence of a second tone in the time domain input samples;
multiplying the first frequency energy value by the fourth frequency energy value to determine a first twist value;
multiplying the second frequency energy value by the third frequency energy value to determine a second twist value;
scaling the greater of the first and second twist values to determine a scaled twist value; and
comparing the lesser of the first and second twist values to the scaled twist value to determine the presence of the first and second tones.

18. A method for detecting a signal, comprising:
receiving at least a first and a second frame of time domain input samples;
generating a plurality of frequency values for the first and second frames;
determining a cross-frame twist ratio based on the plurality of frequency values; and
determining the presence of a first tone and a second tone in the time domain input samples based on the cross-frame twist ratio.

19. The method of claim 18, wherein generating the plurality of frequency energy values includes generating at least a first frequency energy value for the first frame, a second frequency energy value for the second frame, a third frequency energy value for the first frame, and a fourth frequency energy value for the second frame based on the time domain input samples.

20. The method of claim 19, wherein generating the cross-frame twist ratio includes determining a first twist between the first and third frequency energy values and determining a second twist between the second and fourth frequency energy values, and wherein determining the presence of the first and second tones includes comparing the first and second twists to determine the presence of the first and second tones.

21. The method of claim 19, wherein generating the cross-frame twist ratio includes multiplying the first frequency energy value by the fourth frequency energy value to determine a first twist value and multiplying the second frequency energy value by the third frequency energy value to determine a second twist value, and wherein determining the presence of the first and second tones includes scaling the greater of the first and second twist values to determine a scaled twist value and comparing the lesser of the first and second twist values to the scaled twist value to determine the presence of the first and second tones.

22. A signal detector, comprising:
a processor adapted to receive at least a first and a second frame of time domain input samples; and
a memory device coupled to the processor and adapted to store program instructions, that when executed by the processor:
generate a plurality of frequency values for the first and second frames;
determine a cross-frame twist ratio based on the plurality of frequency values; and
determine the presence of a first tone and a second tone in the time domain input samples based on the cross-frame twist ratio.

23. The signal detector of claim 22, wherein the program instructions that generate the plurality of frequency energy values, when executed by the processor, generate at least a first frequency energy value for the first frame, a second frequency energy value for the second frame, a third frequency energy value for the first frame, and a fourth frequency energy value for the second frame based on the time domain input samples.

24. The signal detector of claim 23, wherein the program instructions that determine the cross-frame twist ratio, when executed by the processor, determine a first twist between the first and third frequency energy values and determine a second twist between the second and fourth frequency energy values, and wherein the program instructions that determine the presence of the first and second tones, when executed by the processor, compare the first and second twists to determine the presence of a first tone and a second tone in the time domain input samples.

25. The signal detector of claim 23, wherein the first and second frequency energy values are associated with a first tone frequency, and the third and fourth frequency energy values are associated with a second tone frequency.

26. The signal detector of claim 23, wherein the program instructions that determine the cross-frame twist ratio, when executed by the processor, multiply the first frequency energy value by the fourth frequency energy value to determine a first twist value and multiply the second frequency energy value by the third frequency energy value to determine a second twist value, and wherein the program instructions that determine the presence of the first and second tones, when executed by the processor, scale the greater of the first and second twist values to determine a scaled twist value and compare the lesser of the first and second twist values to the scaled twist value to determine the presence of the first and second tones.

27. A signal detector, comprising:

means for receiving at least a first and a second frame of time domain input samples;

means for generating a plurality of frequency values for the first and second frames;

means for determining a cross-frame twist ratio based on the plurality of frequency values; and means for determining the presence of a first tone and a second tone in the time domain input samples based on the cross-frame twist ratio.

* * * * *